United States Patent
Coffin et al.

(10) Patent No.: US 7,036,132 B1
(45) Date of Patent: Apr. 25, 2006

(54) RECONFIGURABLE CARTRIDGE PROCESSING MODULE FOR STORING CARTRIDGE RECEIVING DEVICES IN A DATA STORAGE SYSTEM

(75) Inventors: Paul C Coffin, Ft Collins, CO (US); Gregg S Schmidtke, Ft Collins, CO (US); Robert W Luffel, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 667 days.

(21) Appl. No.: 09/624,798

(22) Filed: Jul. 24, 2000

(51) Int. Cl.
*G11B 33/04* (2006.01)
*G11B 33/12* (2006.01)
*G11B 17/08* (2006.01)

(52) U.S. Cl. .................................. 720/654
(58) Field of Classification Search ............ 369/30.06, 369/30.38, 30.39, 30.42, 30.67, 30.68, 31.01, 369/75.1, 75.11; 361/685, 725, 727; 720/654, 720/600
See application file for complete search history.

(56) References Cited

U.S. PATENT DOCUMENTS

| | | | |
|---|---|---|---|
| 5,227,954 A * | 7/1993 | Twigg ........................ 361/685 |
| 5,228,016 A * | 7/1993 | Menke ..................... 360/98.06 |
| 5,285,333 A * | 2/1994 | Barr et al. ..................... 360/92 |
| 5,299,089 A * | 3/1994 | Lwee .......................... 361/684 |
| 5,491,609 A * | 2/1996 | Dankman et al. ........... 361/686 |
| 5,524,104 A * | 6/1996 | Iwata et al. ................. 720/652 |
| 5,544,146 A | 8/1996 | Luffel et al. ................ 369/178 |
| 5,841,744 A * | 11/1998 | Menke et al. ............. 369/30.85 |
| 5,870,245 A * | 2/1999 | Kersey et al. ................ 360/92 |
| 5,979,755 A | 11/1999 | Chaya |
| 5,995,477 A * | 11/1999 | Smith et al. ............. 360/98.06 |
| 6,016,249 A * | 1/2000 | Ogawa et al. ............... 361/685 |
| 6,025,972 A | 2/2000 | Schmidtke et al. ...... 360/98.06 |
| 6,034,928 A * | 3/2000 | Inoue .......................... 360/92 |
| 6,059,123 A | 5/2000 | Cotutsca ....................... 211/40 |
| 6,240,058 B1 * | 5/2001 | Pitz et al. ................. 369/30.39 |
| 6,325,353 B1 * | 12/2001 | Jiang ........................... 248/682 |
| 6,353,581 B1 * | 3/2002 | Offerman et al. ........... 369/30.4 |

FOREIGN PATENT DOCUMENTS

| | | |
|---|---|---|
| DE | 4405361 A1 | 8/1995 |
| EP | 052482 A2 | 5/1993 |

(Continued)

OTHER PUBLICATIONS

Falk, Howard. "Large-Capacity Disks". Jun. 1990. The Electronic Library, v8, n3, p209-211.*

(Continued)

*Primary Examiner*—Julie Anne Watko (57) ABSTRACT

A reconfigurable cartridge processing module for use in a data storage system may comprise a frame having a plurality of sets of mounting locations provided thereon so that the frame defines a first component configuration and a second component configuration. In the first component configuration, a first cartridge receiving device is mounted to a first set of the plurality of sets of mounting locations provided on the frame so that the first cartridge receiving device is located at a first position within the frame. A second cartridge receiving device is mounted to a second set of the plurality of sets of mounting locations provided on the frame so that the second cartridge receiving device is located at a second position within the frame. In the second component configuration, a third cartridge receiving device replaces the first and second cartridge receiving devices and is mounted to a third set of the plurality of sets of mounting locations provided on the frame.

17 Claims, 8 Drawing Sheets

FOREIGN PATENT DOCUMENTS

EP 0653759 A2 * 5/1995
WO WO 95//07531 * 3/1995

OTHER PUBLICATIONS

Zulich, Michael J. "The RAID Kit THat Didn't", Oct. 1997. Windows Sources, v5, n10, p121-122.*

Pilgrim, Build Your Own 486/486DX, New York: McGraw-Hill, Inc., 1995.*

TEAC FD-505, "The Dual Drive: TEAC Redefines the Refined Drive", 1992.*

"Dual FDD specification" TEAC, 1992.*

"TEAC FD505 Combo Drive installation manual", TEAC, Mar. 1, 1994.*

"TEAC FD-505 Combination Floppy Drive", Nov. 1992, PC World, v. 10, No. 11, pp. 114-115.*

* cited by examiner

RECONFIGURABLE CARTRIDGE PROCESSING MODULE FOR STORING CARTRIDGE RECEIVING DEVICES IN A DATA STORAGE SYSTEM

FIELD OF INVENTION

This invention relates to cartridge storage systems in general and more specifically to a cartridge storage system having a reconfigurable cartridge processing module.

BACKGROUND

Many different types of data storage systems exist and are being used to store data cartridges at known locations and to retrieve those data cartridges from the storage locations so that data may be written to or read from those data cartridges.

A typical data storage system may include one or more cartridge receiving devices for holding the various data cartridges. For example, one type of cartridge receiving device may comprise a cartridge storage rack or "magazine" while another type of cartridge receiving device may comprise a cartridge read/write device. Cartridge read/write devices come in various sizes including full-width cartridge read/write devices and, more recently, half-width cartridge read/write devices.

The data storage system may also be provided with a cartridge access device for accessing the various data cartridges contained in the various cartridge receiving devices. The data storage system may also include a cartridge positioning system that is operatively associated with the cartridge access device. The cartridge positioning system is used to move the cartridge access device among the various cartridge receiving devices, thereby allowing the cartridge access device to access the data cartridges that may be contained in the various cartridge access devices. Typically, when certain data contained on a particular data cartridge are desired, a host computer system will issue a command to a control system associated with the data storage system. The control system then actuates the cartridge positioning system which moves the cartridge access device along the cartridge storage magazines until the cartridge access device is positioned adjacent the desired data cartridge. The cartridge access device then removes the data cartridge from the cartridge storage magazine and carries it to the cartridge read/write device. Thereafter, cartridge access device inserts the selected data cartridge into the cartridge read/write device so that the host computer may read data from or write data to the selected data cartridge. After the read/write operation is complete, the cartridge access device may remove the data cartridge from the cartridge read/write device and return it to its appropriate location in the cartridge storage magazine.

While data storage systems of the type described above work well and are currently being used, the continuing need to store ever increasing numbers of data cartridges can place significant limitations on the data storage system. For example, in data storage systems of the type described above, the data cartridges may be stored in one or more vertical columns or stacks which define a single cartridge access plane. While the data storage capacity of such a system may be increased by increasing the number of data cartridges stored in the vertical columns, there is a limit to the number of data cartridges that can be stored in a given column. That is, the higher the column (i.e., the more data cartridges that are stored in the column), the longer it takes the cartridge access device to access a given data cartridge, particularly if the data cartridge is located at the extreme ends of the column. While more columns of shorter heights may be provided, this comes at the expense and difficulty of providing a positioning system capable of moving the cartridge access device vertically along a given column or stack as well as horizontally along the various rows of storage columns. Regardless of which approach is employed, increasing the data cartridge storage capacity comes at the cost of increasing the overall size of the data storage system thus creating a tradeoff between minimizing size and maximizing storage capacity.

Another design criterion for data storage systems is conserving and minimizing volumetric space. Often, if not always, the more volumetric space that is needed to store data cartridges, the more costly the data storage system. An equally important design criterion is minimizing the time needed for the cartridge access device to access a given data cartridge.

Partly in an effort to increase data cartridge storage capacity, data storage systems have been developed that store the data cartridges in two separate stacks or columns that define two separate cartridge access planes. For example, the data cartridges may be arranged in a pair of columns positioned on opposite sides of the cartridge access device. If this arrangement is used, however, it is necessary to provide the cartridge access device with a "pass-through" cartridge engaging assembly or "picker" that is capable of accessing the data cartridges stored in the two separate stacks. Alternatively, such systems have been provided with "flipping" or rotating picker systems to access the data cartridges stored in both stacks. While this "multi-plane" data storage system is currently being used, the pass-through, flipping, or rotating picker assemblies required for the cartridge access device are relatively complex, expensive to manufacture and tend to suffer from decreased reliability, primarily as a result of the relatively complex mechanical systems associated with such picker assemblies.

Another type of data storage system achieves increased storage capacity by arranging the data cartridges on a rotating magazine stack. While the rotating magazine stack usually does away with the need to provide the cartridge access device with a pass-through, flipping, or rotating picker, the mechanical complexity of the rotating magazine rack, like the picker assembly in the aforementioned "multi-plane" data storage systems, increases manufacturing costs and tends to suffer from decreased reliability.

Consequently, a need remains for a data storage system having an increased cartridge storage capacity that does not require adding any additional volumetric space to the data storage system. Ideally, the data storage system would provide this additional cartridge storage capacity without increasing the overall complexity of the data storage system (i.e., the addition of a pass-through, flipping or rotating picker assembly or a rotating cartridge magazine rack) and without increasing the time needed for the cartridge access device to access the data cartridges.

SUMMARY OF THE INVENTION

A reconfigurable cartridge processing module for use in a data storage system may comprise a frame having a plurality of sets of mounting locations provided thereon so that the frame defines a first component configuration and a second component configuration. In the first component configuration, a first cartridge receiving device is mounted to a first set of the plurality of sets of mounting locations provided on the frame so that the first cartridge receiving device is located at a first position within the frame. A second cartridge receiving device is mounted to a second set of the plurality of sets of mounting locations provided on the frame so that the second cartridge receiving device is located at a second position within the frame. In the second component configuration, a third cartridge receiving device replaces the first and second cartridge receiving devices and is mounted to a third set of the plurality of sets of mounting locations provided on the frame.

Also disclosed is a method of providing a reconfigurable cartridge processing module for use in a data storage system. One step involves providing a frame having a plurality of sets of mounting locations thereon. Another step involves either defining a first component configuration by mounting a first cartridge receiving device to a first set of the plurality of sets of mounting locations provided on the frame and by mounting a second cartridge receiving device to a second set of the plurality of sets of mounting locations provided on the frame so that the second cartridge receiving device is located adjacent the first cartridge receiving device; or, in the alternative, defining a second component configuration by mounting a third cartridge receiving device to a third set of the plurality of sets of mounting locations provided on the frame.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
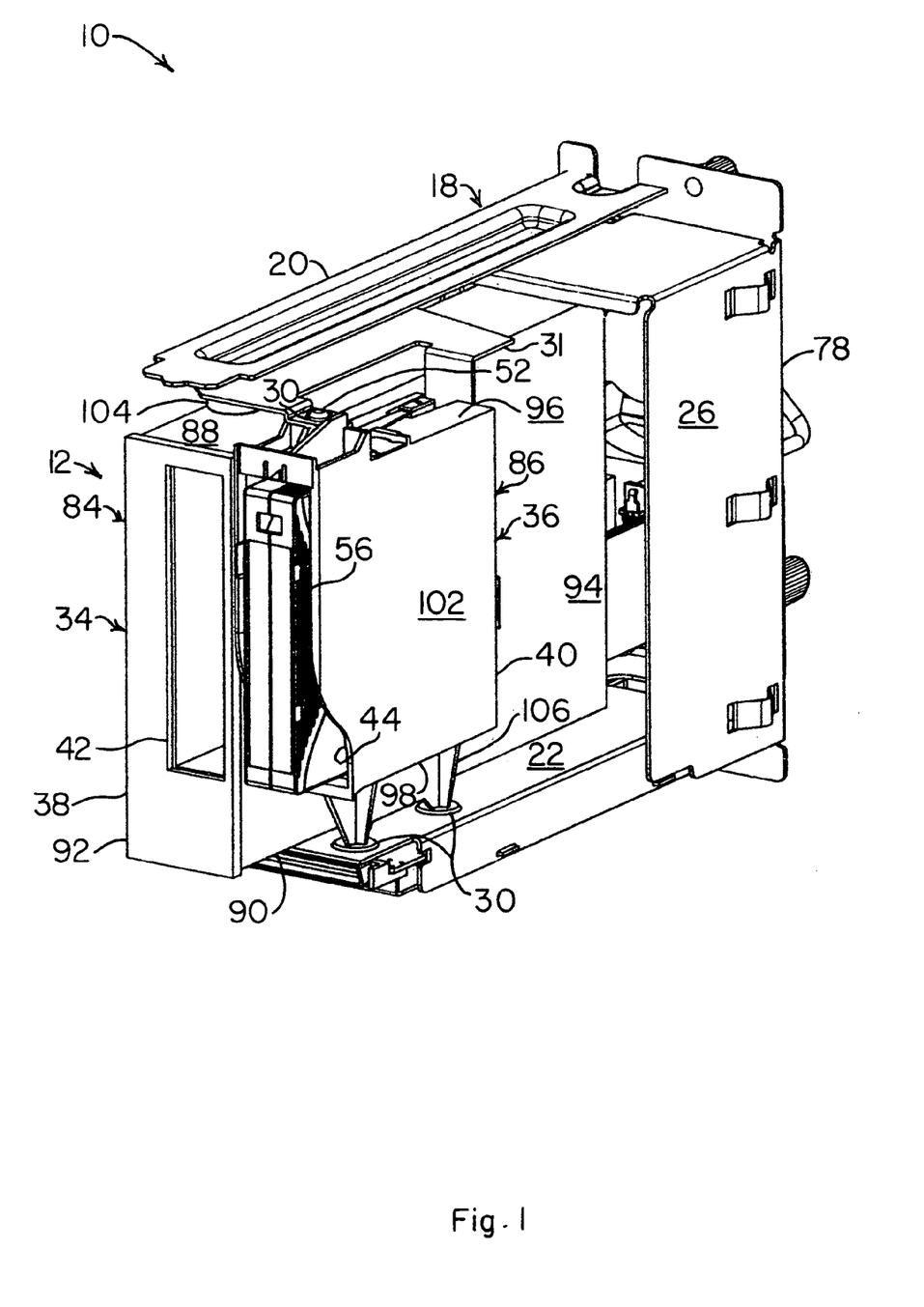
FIG. 1 is a perspective view of the reconfigurable cartridge processing module in a first component configuration according to one preferred embodiment of the invention.
Figure 2:
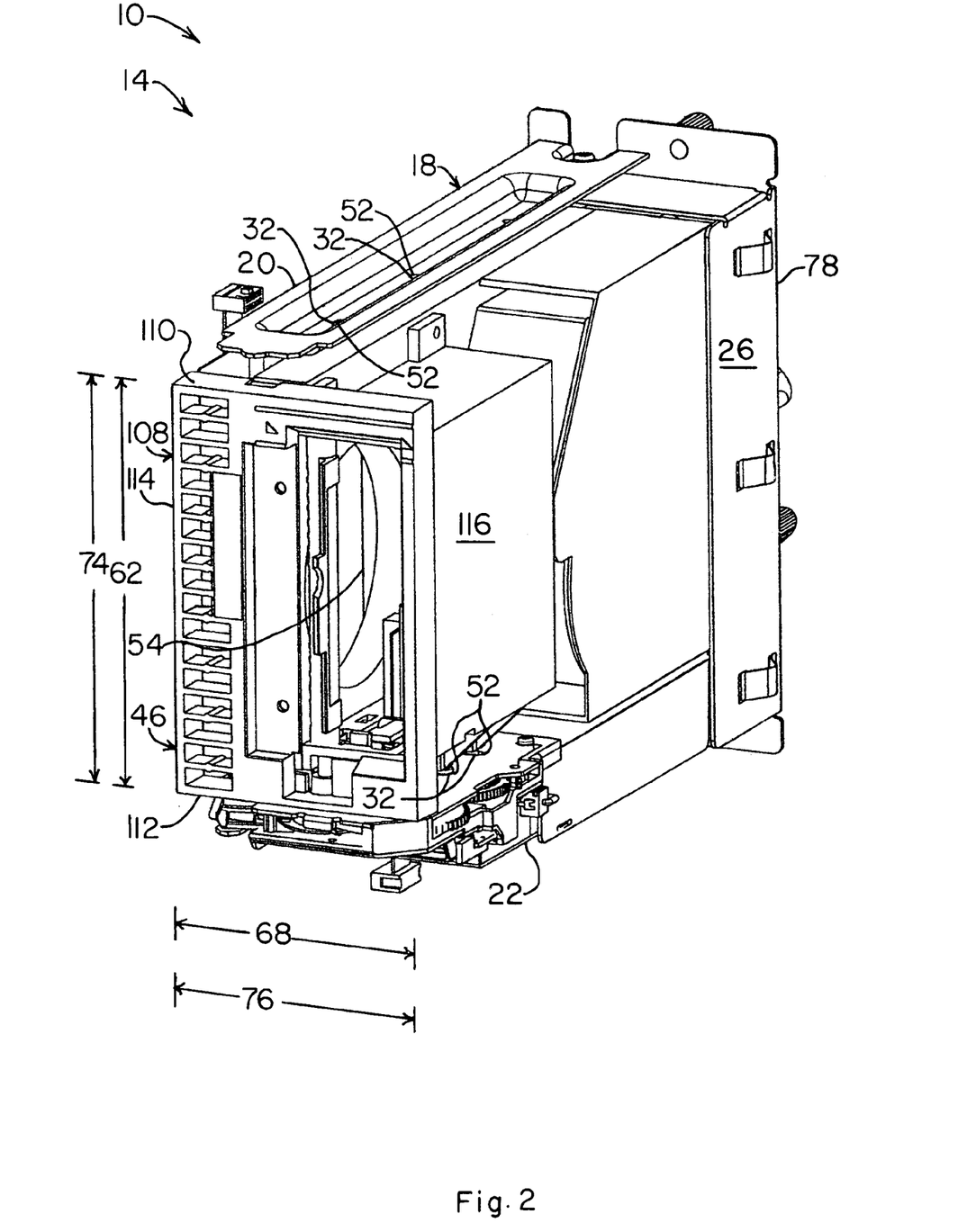
FIG. 2 is a perspective view of the reconfigurable cartridge processing module in a second component configuration according to one preferred embodiment of the invention.
Figure 3:
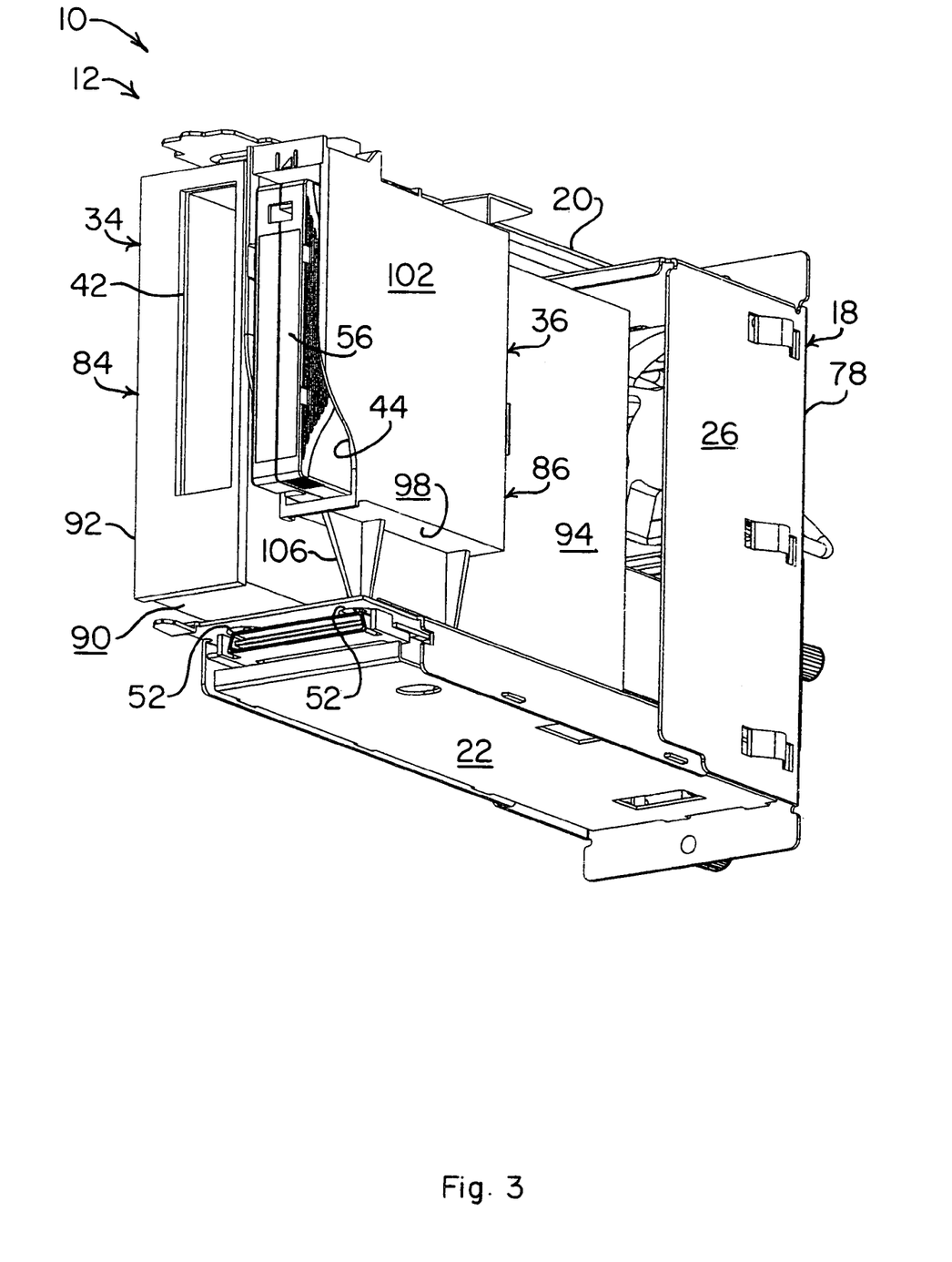
FIG. 3 is a perspective view of the lower plate of the reconfigurable cartridge processing module.
Figure 4:
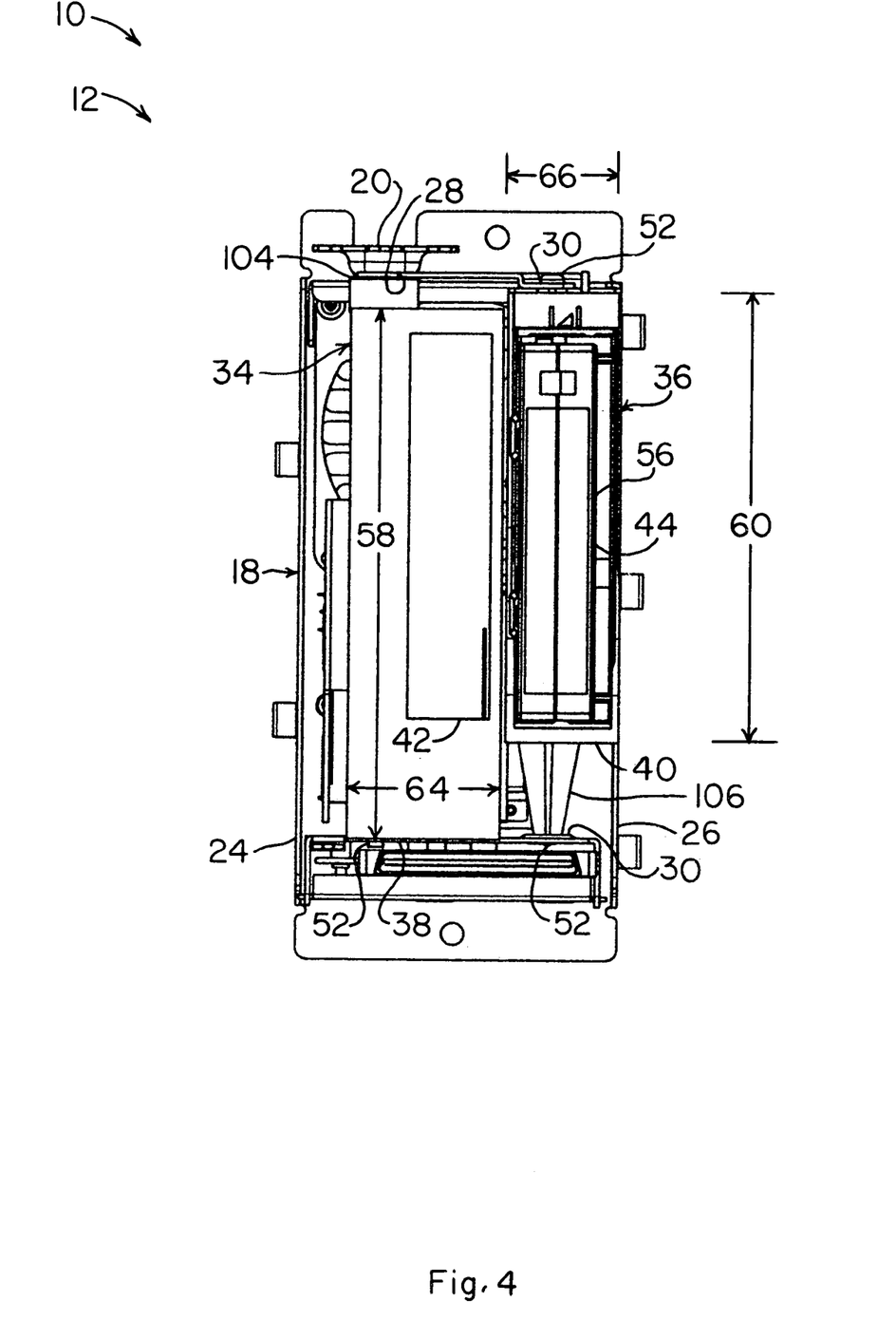
FIG. 4 is a front view in elevation of the reconfigurable cartridge processing module.
Figure 8:
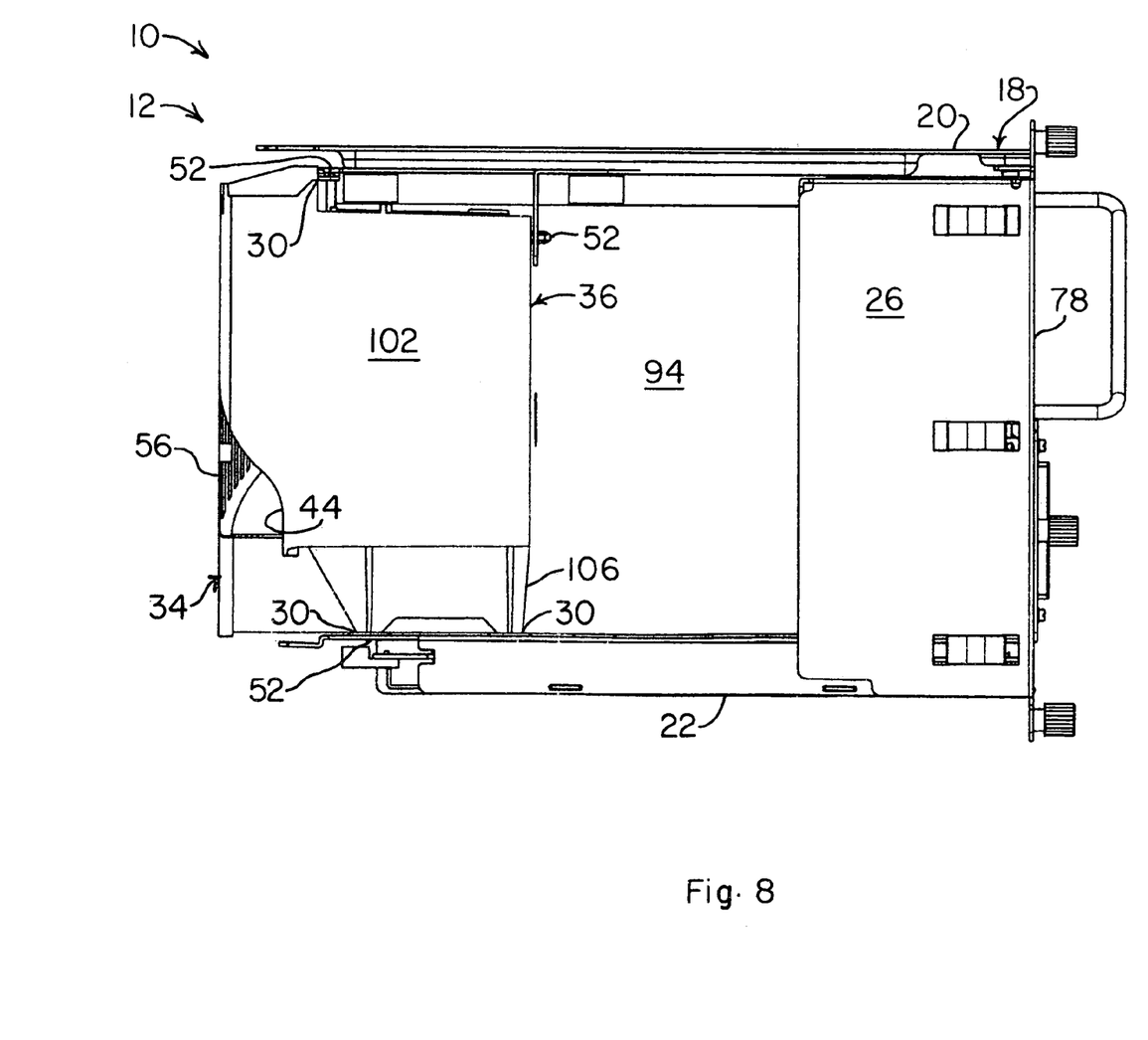
FIG. 8 is a side view in elevation of the reconfigurable cartridge processing module.

A reconfigurable cartridge processing module 10 according to one preferred embodiment of the present invention is shown in a first component configuration 12 in FIG. 1 and in a second component configuration 14 in FIG. 2. The reconfigurable cartridge processing module 10 is shown and described herein as it could be used in conjunction with a data storage system (not shown) of the type well-known in the art. Alternatively, other uses are possible, as will be discussed below. The reconfigurable cartridge processing module 10 may comprise a frame 18 having an upper plate 20 (FIGS. 1, 2, and 5), a lower plate 22 (FIGS. 3 and 6) and two opposed sides or surfaces 24 (FIG. 4) and 26 (FIGS. 4 and 8). A plurality of sets of mounting locations (i.e., 28, 30, 32) may be provided on any of the various component parts, e.g., 20, 22, 24, 26, of frame 18 so that the frame 18 defines the first component configuration 12 and the second component configuration 14.

With reference now primarily to FIG. 1, the first component configuration 12 may comprise first and second cartridge receiving devices 34 and 36 mounted to respective first and second sets 28 and 30 of the plurality of sets of mounting locations provided on the upper and lower plates 20 and 22 of frame 18. In the first component configuration 12, the first and second devices 34 and 36 are located at first and second positions 38 and 40, respectively, within the frame 18. The first and second positions 38 and 40 may be located adjacent and alongside one another. That is, in the embodiment shown and described herein, the second position 40 is located adjacent and alongside the first position 38 so that the second device 36 is located adjacent and alongside the first device 34. Accordingly, the cartridge insert slot 42 of the first cartridge receiving device 34 is located adjacent and alongside the cartridge insert slot 44 of the second cartridge receiving device 36. The first and second cartridge receiving devices 34 and 36 may be sized to fit between the upper and lower plates 20 and 22 and between the left and right sides 24 and 26 of frame 18.

With reference now to FIG. 2, the second component configuration 14 may comprise a third cartridge receiving device 46 that replaces the first and second cartridge receiving devices 34 and 36. The third cartridge receiving device 46 is mounted to a third set 32 of the plurality of sets of mounting locations provided on the upper and lower plates 20 and 22 of frame 18. The third cartridge receiving device 46 may extend between the upper and lower plates 20 and 22, and between the left and right sides 24 and 26 of frame 18.

The various cartridge receiving devices 34, 36, and 46 may comprise any of a wide variety of different types of cartridge receiving devices known in the art. For example, the cartridge receiving devices 34, 36, and 46 may comprise cartridge storage magazines or cartridge read/write devices. In the embodiment shown and described herein, the first cartridge receiving device 34 comprises a so-called "half-height" cartridge read/write device, while the second cartridge receiving device 36 comprises a cartridge storage magazine. The third cartridge receiving device 46 comprises a so-called "full-height" cartridge read/write device.

Before proceeding with the description, it should be noted that the terms "full-height" and "half-height" are generally used by persons having ordinary skill in the art to describe disk or tape drive units having heights that are have the same height as a standard form factor, as in the case of a full-height drive, or about half of the height of the standard form factor, as in the case of a half-height drive. However, since the drive units shown and described herein are turned on their sides, i.e., mounted generally vertically, the half-height drive 34 may be referred to herein in the alternative as a "half-width" drive, since the height becomes the width in the vertical mounting arrangement. Similarly, the full-height drive 46 may be referred to herein in the alternative as a "full-width" drive.

As best seen by comparing FIGS. 1 and 2, the reconfigurable cartridge processing module 10 allows for either a half-width (i.e., half-height) cartridge read/write device 34 and a cartridge storage magazine 36 to be mounted to the frame 18, i.e., substantially between the upper and lower plates 20, 22 and substantially between the right and left sides 24, 26 of frame 18 or, alternatively, a full-width (i.e., full-height) cartridge read/write device 46 to be mounted to the frame 18. Stated differently, the present invention provides a volumetrically efficient architecture that allows a half-width cartridge read/write device 34 and a cartridge storage magazine 36 to be mounted within the same volumetric space as a full-width cartridge read/write device 46. Thus, the data cartridge storage capacity of the data storage system can be increased with no additional volumetric space being added by simply replacing a full-width (i.e., full-height) cartridge read/write device 46 with a half-width (i.e., half-height) cartridge read/write device 34 and a cartridge storage magazine 36.

To reconfigure the module 10 from the first component configuration 12 to the second component configuration 14, or vice versa, a user simply has to remove and then install the desired devices. No mechanical changes need be made to the reconfigurable cartridge processing module 10. Indeed, the same cartridge access device (not shown) and cartridge positioning device (also not shown) associated with the data storage system can be used in either component configuration 12 or 14.

To remove a device (e.g., 34, 36, or 46) from the reconfigurable cartridge processing module 10, the device, if a cartridge read/write device (e.g., 34 or 46), must first be disconnected from the electrical system (not shown) associated with the data storage system (also not shown). The next step in the removal process is to remove or disengage the fasteners 52, which may be used to secure the device (e.g., 34, 36, or 46) to the frame 18. Removal of the fasteners 52 allows the device (e.g., 34, 36, or 46) to be removed from the frame 18. The device or devices can then be removed from the reconfigurable cartridge processing module 10.

Installing a device (e.g., 34, 36, or 46) in the reconfigurable cartridge processing module 10 is equally convenient in that it first involves inserting the device (e.g., 34, 36 or 46) into the reconfigurable cartridge processing module 10. The device is next secured to the frame 18 by fasteners 52. The device, if a cartridge read/write device (e.g., 34 or 46), is then electrically connected to the electrical system (not shown) provided in the data storage system (also not shown).

It is generally preferred, but not required, that the devices 34 and 36 be mounted within the frame 18 so that the cartridge insert slot 44 of the second cartridge receiving device 36 is positioned adjacent and alongside the cartridge insert slot 42 of the first cartridge receiving device 34. So positioning the devices 34 and 36 so that their respective cartridge insert slots 42 and 44 are alongside one another reduces the time needed for the cartridge access device (not shown) to retrieve a data cartridge 56 contained within either the first or second cartridge receiving device 34 or 36 and to insert that data cartridge 56 into the other device. It is also preferable, although not required, that the cartridge read/write device 46 be positioned so that its cartridge insert slot 54 is located at the same position as that of either of the cartridge insert slots 42 or 44 of the cartridge receiving devices 34 or 36. Such an arrangement allows the cartridge access device (not shown) to more easily adapt to either the first component configuration 12 (FIG. 1) or the second component configuration 14 (FIG. 2).

A significant advantage of the present invention is that it allows the data cartridge storage capacity of the data storage system (not shown) to be increased without adding any additional volumetric space to the data storage system. By providing a volumetrically efficient architecture for mounting a half-width (i.e., half-height) cartridge read/write device (e.g., 34) and a cartridge storage magazine (e.g., 36), the present invention may allow a data storage system requiring less volumetric space to be selected which could not otherwise be used if additional volumetric space were necessary to replace a full-width (i.e., full-height) cartridge receiving device with a half-width (i.e., half-height) cartridge read/write device and a cartridge storage magazine. Alternatively, additional space might be available for providing the data storage system with other devices.

Another significant advantage of the present invention is that it allows a cartridge processing module sized to receive a full-width cartridge read/write device (e.g., 46) to be upgraded to a configuration that includes a half-width cartridge read/write device (e.g., 34) and an adjacent cartridge storage magazine (e.g., 36) without requiring any mechanical changes to the module 10. Alternatively, the cartridge processing module 10 could be initially configured to receive the half-width cartridge read/write device 34 and cartridge storage magazine 36.

Yet another advantage of the present invention is the ease with which the module 10 can be reconfigured from the first component configuration 12 to the second component configuration 14, and vice versa. As discussed earlier, the process of installing and removing devices is simple and convenient. Moreover, the present invention does not require any mechanical changes to the reconfigurable cartridge processing module 10 when switching between the first and second component configurations 12 and 14. Therefore, a user may easily switch or reconfigure the module 10 between the first component configuration 12 and the second component configuration 14.

Still yet another advantage of the present invention is that it is able to provide an additional cartridge storage magazine without adding to the overall complexity of the data storage system. Indeed, the same cartridge access device (not shown) and cartridge positioning device (not shown) can be used regardless of the configuration of the reconfigurable cartridge processing module 10. Moreover, since the cartridge insert slots 42, 44 of the respective first and second cartridge receiving devices 34 and 36 are located adjacent and alongside one another in the embodiment shown and described herein, the time needed for the cartridge access device (not shown) to retrieve a data cartridge 56 from one of the devices 34 or 36 and to insert it into the other device is minimized.

Having briefly described the reconfigurable cartridge processing module 10, as well as some of its more significant features and advantages, the various embodiments of the reconfigurable cartridge processing module according to the present invention will now be described in detail. However, before proceeding with the description, it should be noted that while the reconfigurable cartridge processing module 10 is shown and described herein as it could be used to support either a full-width (i.e., full-height) cartridge read/write device 46 or a half-width (i.e., half-height) cartridge read/write device 34 and a cartridge storage magazine 36, other types of devices may be supported by the reconfigurable cartridge processing module 10. It should also be noted that while the reconfigurable cartridge processing module 10 is shown and described herein as it could be used to support a half-width cartridge read/write device 34 adjacent and alongside a cartridge storage magazine 36, other configurations may be used (i.e. a vertically stacked arrangement) as would be obvious to persons having ordinary skill in the art after having become familiar with the teachings of the present invention. Moreover, the cartridge receiving devices 34, 36, or 46 are shown herein as being positioned such that their respective cartridge insert slots 42, 44 and 54 are oriented vertically, i.e., so that their respective heights 58, 60, 62 exceed their respective widths 64, 66, 68. Alternatively, other mounting orientations may be used, as would be obvious to persons having ordinary skill in the art after having become familiar with the teachings of the present invention. Consequently, the present invention should not be regarded as limited to the particular devices, components, applications and configurations shown and described herein.

With the foregoing considerations in mind, the reconfigurable cartridge processing module 10 according to one preferred embodiment of the present invention is shown in a first component configuration 12 in FIG. 1 and in a second component configuration 14 in FIG. 2. The reconfigurable cartridge processing module 10 is described herein as it could be used in conjunction with a data storage system (not shown) of any type that is now known in the art or that may be developed in the future.

The data storage system (not shown) in which may be used the reconfigurable cartridge processing module 10 may comprise a cartridge access device (not shown) for accessing a data cartridge (e.g., cartridge 56), which may be contained in the cartridge insert slots 42, 44, or 54 of the various respective devices 34, 36, or 46. The data storage system may also include a cartridge positioning device (not shown) for moving the cartridge access device to the specific cartridge receiving device 34, 36, or 46. The data storage system may be connected to a host computer (not shown) that issues commands to a control system (not shown) contained within the data storage system. The control system may actuate the cartridge positioning device.

Since data storage systems of the type described above are well-known in the art and could be readily provided by persons having ordinary skill in the art after having become familiar with the teachings of the present invention, the various component parts and systems (e.g., the cartridge access device, cartridge positioning system, control system, host computer, etc.) of the data storage system utilized in one preferred embodiment of the invention will not be discussed in further detail herein.

Referring now primarily to FIGS. 1–6, the reconfigurable cartridge processing module 10 may be provided with a frame 18 comprising an upper plate 20 (FIGS. 1, 2, and 5), a lower plate 22 (FIGS. 3 and 6), a left or first side 24 (FIG. 4) and a right or second side 26 (FIGS. 4 and 8). A plurality of sets of mounting locations (i.e., 28, 30, 32) may be provided on any of the component parts of the frame 18 so that the frame 18 defines the first component configuration 12 (illustrated in FIG. 1) and the second component configuration 14 (illustrated in FIG. 2). In the embodiment shown and described herein, the first 28, second 30, and third 32 sets of mounting locations are provided on the upper and lower plates 20 and 22 of frame 18. Alternatively, the mounting locations may be provided on other elements (e.g., the left and rights sides 24 and 26) of the frame 18.

With reference now primarily to FIGS. 1 and 2, the upper and lower plates 20, 22 of frame 18 may be positioned in generally parallel, spaced-apart relation to one another. The left and right sides 24, 26 may also be positioned in generally parallel, spaced-apart relation to one another. The upper and lower plates 20, 22 may be separated by a spaced distance 74 that is greater than, or at least equal to, the greatest among the heights 58, 60, 62 of devices 34, 36, 46, respectively. The left and right sides 24, 26 may be separated by a spaced distance 76 that is greater than, or at least equal to, the greater of the width 68 of the third device 46 or the combined widths 64 and 66 of the first and second devices 34, 36. In the embodiment shown and described herein, the spaced distances 74 and 76 are about equal to the height 62 and width 68, respectively, of the third cartridge receiving device 46. See FIG. 2.

Figure 6:
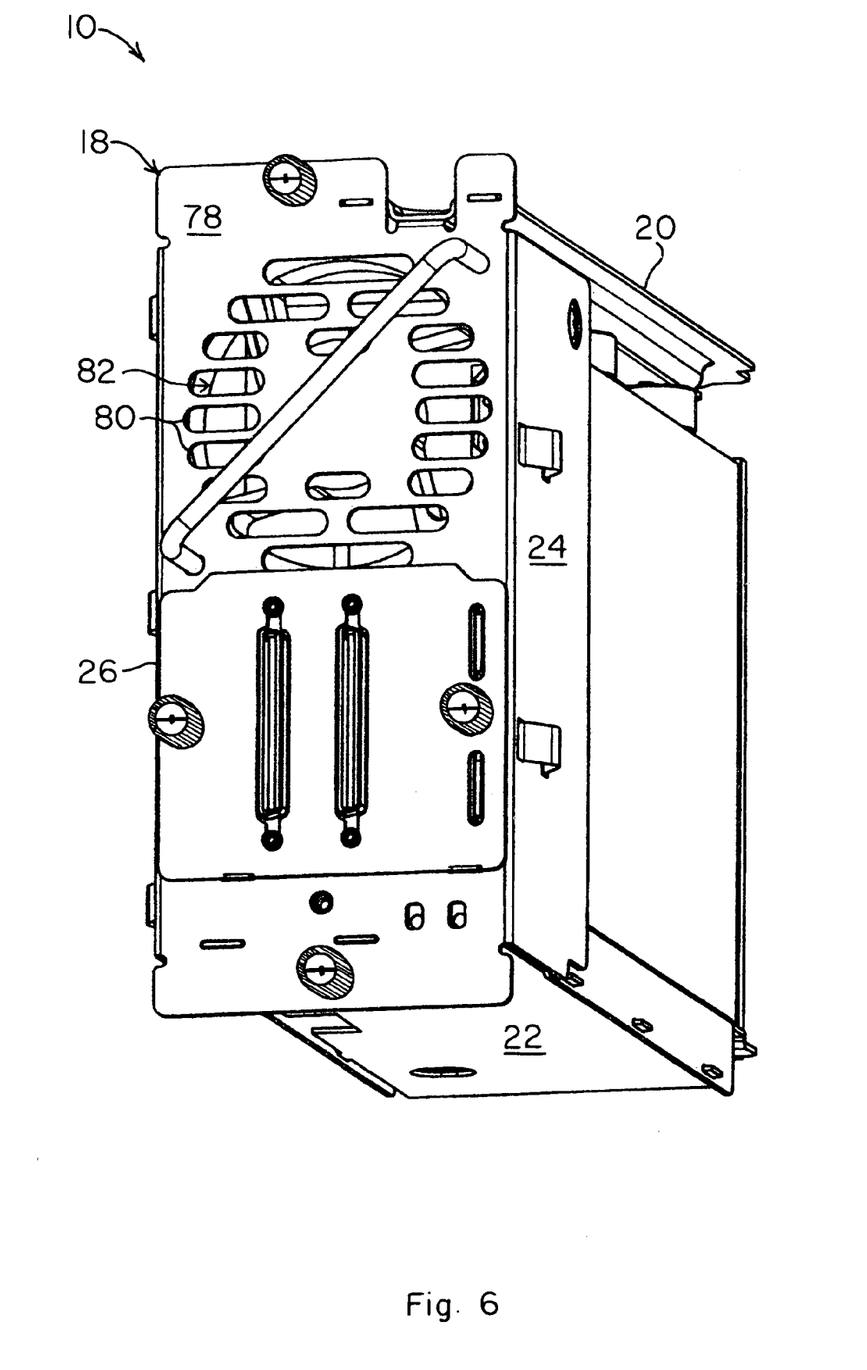
FIG. 6 is a perspective view of the back and lower plate of the reconfigurable cartridge processing module.
Figure 7:
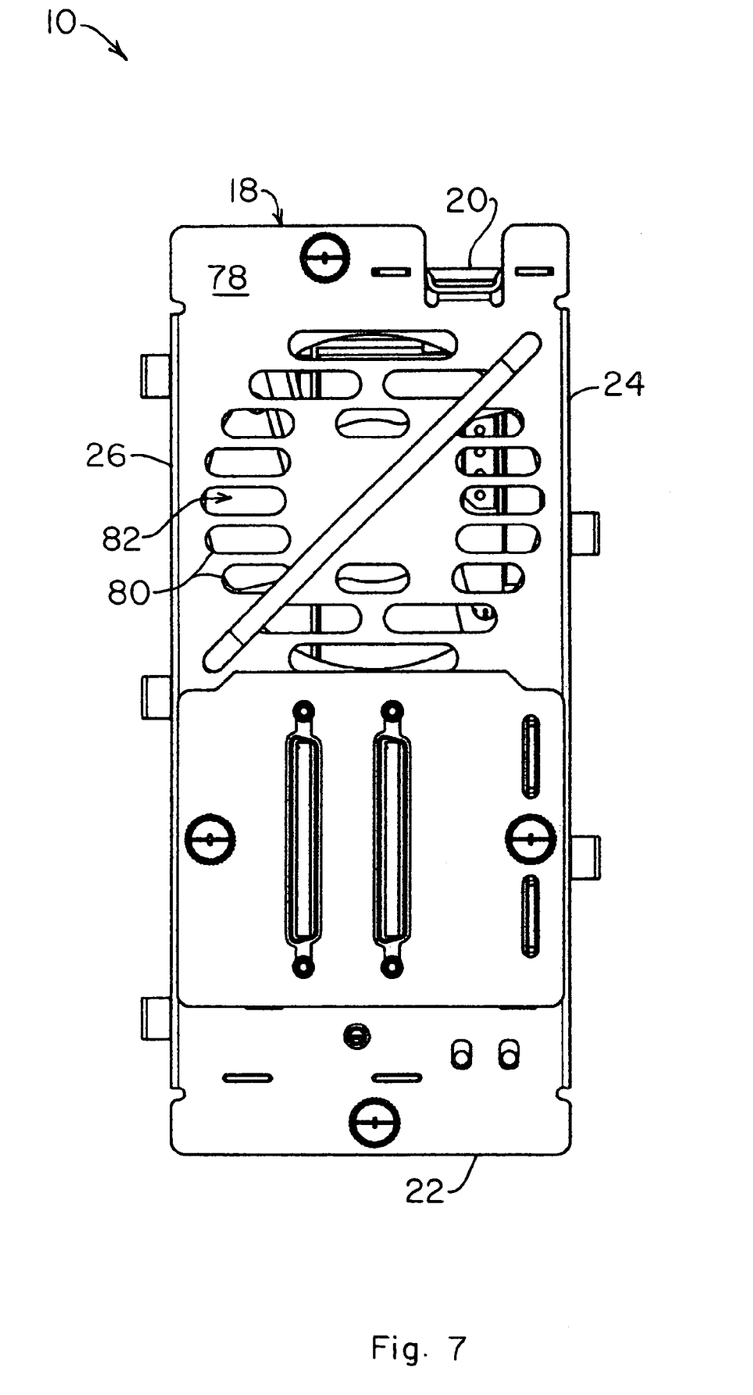
FIG. 7 is a rear view in elevation of the back plate of the reconfigurable cartridge processing module.

Referring now to FIGS. 6 and 7, the frame 18 may also be provided with a back plate or panel 78. The back plate 78 may have an airway 80 for allowing air to be either drawn into or discharged out of the reconfigurable cartridge processing module 10. The air allows for the cooling of the devices (e.g., 34, 36, or 46) comprising the reconfigurable cartridge processing module 10. The airway 80 may be provided with a blower assembly 82, although the blower assembly 82 is not required. In one preferred embodiment, the blower assembly 82 may comprise any of a wide range of blowers that are well-known in the art and readily commercially available. However, since such blower assemblies are well-known in the art and since the details of the blower assembly 82 are not necessary to understand or practice the present invention, the particular blower assembly utilized in one preferred embodiment of the present invention will not be described in further detail.

The various component parts of the frame 18 may be made from any of a wide range of materials, such as metals or plastics, that would be suitable for the intended application. By way of example, the various sides 20, 22, 24, 26, 78 of frame 18 may be formed from sheet metal. Alternatively, other materials and/or forming techniques may be used, as would be obvious to persons having ordinary skill in the art after having become familiar with the teachings of the present invention.

As was mentioned above, the first, second and third sets of mounting locations 28, 30 and 32 provided on the frame 18 define various component configurations (e.g., 12 and 14) for the frame 18. More specifically, the first and second sets of mounting locations 28 and 30 together define the first component configuration 12 illustrated in FIG. 1, whereas the third set of mounting locations 32 defines, by itself, the second component configuration 14 illustrated in FIG. 2. Of course, some or all of the individual mounting locations comprising a given set of mounting locations may be used for other sets of mounting locations. That is, some of the individual mounting locations may be shared between the various sets of mounting locations. For example, the third set of mounting locations 32 may comprise one or more individual mounting locations in the first mounting location set 28 and one or more individual mounting locations in the second mounting location set 30. Alternatively, each set of mounting locations 28, 30, and 32 may comprise its own set of individual mounting points or locations.

Referring now primarily to FIG. 1, the first component configuration 12 may comprise a first cartridge receiving device 34 and a second cartridge receiving device 36. The first cartridge receiving device 34 may be provided with a chassis or housing 84 suitable for holding the various systems and components (not shown) that may be contained within device 34. The first cartridge receiving device 34 may comprise any of a wide range of cartridge receiving devices now known in the art or that may be developed in the future. In the embodiment shown and described herein, the first cartridge receiving device 34 comprises a half-width (i.e., half-height) cartridge read/write device of the type that is well-known in the art and readily commercially available.

In the embodiment shown and described herein, the housing 84 of the first cartridge receiving device 34 may comprise a generally rectangularly shaped structure having a top surface 88, bottom surface 90 and two opposed sides or surfaces 92, 94. The top and bottom surfaces 88, 90 of housing 84 may be positioned in generally parallel, spaced-apart relation to one another and may be separated by a spaced distance that is about equal to the height 58 of the first device 34 (FIG. 4). The left and right sides 92, 94 of housing 84 also may be positioned in generally parallel, spaced-apart relation to one another and may be separated by a spaced distance that is about equal to the width 64 of the first device 34. See FIG. 4. Alternatively, of course, other configurations are possible, as would be obvious to persons having ordinary skill in the art after having become familiar with the teachings of the present invention.

The housing 84 of the first cartridge receiving device 34 may be made from any of a wide range of materials, such as metals or plastics, suitable for the intended application. By way of example, the various sides 88, 90, 92, 94 of housing 84 may be formed from sheet metal. Alternatively, other materials and/or forming techniques may be used, as would be obvious to persons having ordinary skill in the art after having become familiar with the teachings of the present invention.

Figure 5:
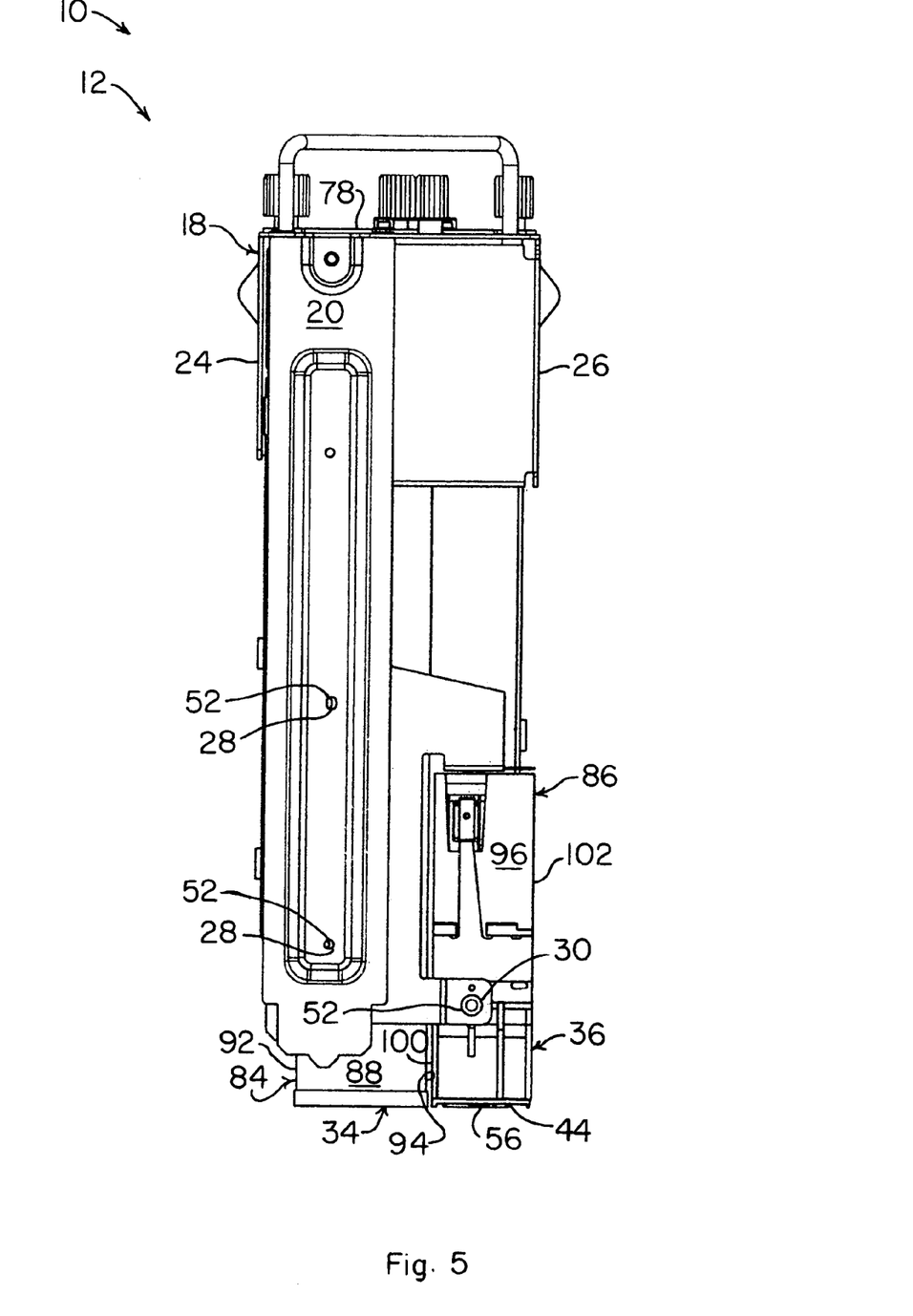
FIG. 5 is a top view of the upper plate of the reconfigurable cartridge processing module.

The housing 84 may be provided with one or more mounting bosses or extension members 104 to allow the housing 84 to be mounted to the frame 18, although such mounting bosses or extension members 104 are not required. The extensions 104 may be attached to either the top or bottom surface 88 or 90 of housing 84 or, alternatively, to both surfaces 88 and 90 of housing 84. The extensions 104 may extend from the respective surface 88 and/or 90 to which they are attached to the first set of mounting locations 28 provided on the upper and lower plates 20, 22, respectively, of frame 18. In the embodiment shown and described herein, since the height 58 of the first cartridge receiving device 34 is less than the spaced distance 74 separating the upper and lower plates 20, 22, the extension members 104 are attached to the top surface 88 of housing 84 and extend from top surface 88 to the first set of mounting locations 28 provided on the upper plate 20 of frame 18 (FIG. 5). Alternatively, extensions 104 could be attached to the bottom surface 90 instead of to the top surface 88, or could be attached to both top and bottom surfaces 88 and 90. In still another alternative arrangement, the extensions 104 may not be required at all if device 34 is a full-height device with a height 58 equal to the spaced distance 74 separating the upper and lower plates 20, 22.

The first cartridge receiving device 34 may be mounted to the first set of mounting locations 28 provided on the upper and lower plates 20, 22 of frame 18 so that the first device 34 is located at a first position 38 within the frame 18. It is generally preferred, but not required, that the first cartridge receiving device 34 be secured to the frame 18. For example, the first cartridge receiving device 34 may be secured to the upper and lower plates 20, 22 of frame 18 at the first set of mounting locations 28, respectively, with fasteners 52. Fasteners 52 may comprise any of a wide range of fastening systems or devices (e.g., bolt and nut assemblies, pins, screws, rivets, adhesives, formed tabs and hooks, brackets, etc.), suitable for the intended application. In the embodiment shown and described herein, the extensions 104 of housing 84 are secured to the upper plate 20 by a pair of fasteners 52 (FIG. 5) while the bottom surface 90 of housing 84 is secured to the lower plate 22 by a pair fasteners 52, only one of which is shown herein. It is also generally preferred, but not required, that the first device 34 be mounted within frame 18 so that its cartridge insert slot 42 is oriented vertically (i.e., mounted such that the height 58 of the first device 34 exceeds its width 64). See FIG. 4.

The second cartridge receiving device 36 may also be provided with a chassis or housing 86 suitable for holding the various systems and components (not shown) that may be contained within device 36. By way of example, the second cartridge receiving device 36 may comprise a cartridge storage magazine. Alternatively, the second cartridge receiving device 36 may comprise any of a wide range of cartridge receiving devices now known in the art or that may be developed in the future.

In the embodiment shown and described herein, the housing 86 of the second cartridge receiving device 36 (e.g., cartridge storage magazine) may comprise a generally rectangularly shaped structure having a top surface 96, bottom surface 98, and two opposed sides or surfaces 100, 102. The top and bottom surfaces 96, 98 of housing 86 may be positioned in generally parallel, spaced-apart relation to one another and be separated by a spaced distance that is about equal to the height 60 of the second device 36. See FIG. 4. The left and right sides 100, 102 of housing 86 may also be positioned in generally parallel, spaced-apart relation to one another and be separated by a spaced distance that is about equal to the width 66 of the second device 36. Alternatively, of course, other configurations are possible.

The housing 86 may be made from any of a wide range of materials, such as metals or plastics, suitable for the intended application. By way of example, the various sides 96, 98, 100, 102 of housing 86 may be formed from sheet metal. Alternatively, other materials and/or forming techniques may be used, as would be obvious to persons having ordinary skill in the art after having become familiar with the teachings of the present invention.

The housing 86 of the second device 36 may be provided with a pair of legs or extensions 106. The extensions 106 may be attached to either the top or bottom surface 96 or 98 of housing 86 or, alternatively, to both surfaces 96 and 98. The extensions 106 may extend from the respective surfaces 96 and/or 98 to the second set of mounting locations 30 provided on the upper and lower plates 20, 22, respectively. In the embodiment shown and described herein, the height 60 of the second cartridge receiving device 36 is less than the spaced distance 74 separating the upper and lower plates 20, 22. Therefore, the extensions 106 are attached to the bottom surface 98 of housing 86 and extend from bottom surface 98 to the second set of mounting locations 30 provided on the lower plate 22. The housing 86 with extensions 106 attached thereto fits between the upper and lower plates 20, 22 of frame 18. Alternatively, the need for extensions 106 may be dispensed with if device 36 is a full-height device with a height 60 equal to the spaced distance 74 separating the upper and lower plates 20, 22.

The second cartridge receiving device 36 may be mounted to the second set of mounting locations 30 provided on the upper and lower plates 20, 22 of frame 18 so that the second device 36 is located at a second position 40 within the frame 18. It is generally preferred, but not required, that the top surface 96 of second cartridge receiving device 36 be secured to the frame 18 via a mounting bracket 31. Mounting bracket 31 may be secured to the mounting locations 30 provided on the upper plate 20 by a pair of fasteners 52. In this regard it should be noted that the pair of mounting locations 30 on the upper plate 20 are the same as the pair of mounting locations 28 on the upper plate 20 that are used to secure the half-width device 34 to the upper plate 20. Alternatively, the bracket 31 could be secured to a separate set of mounting locations (not shown) provided on the upper plate 20. The cartridge magazine 36 may be secured to the mounting bracket 31 by a fastener 52. The extensions 106 provided on the magazine 36 may be secured to a pair of mounting locations 20 provided on the lower plate 22 by a pair fasteners 52 (only one fastener 52 is shown in FIGS. 3 and 4). As was already mentioned, it is also generally preferred, but not required, that the second device 36 be mounted within frame 18 so that its cartridge insert slot 44 is oriented vertically (i.e., mounted such that the height 60 of the second device 36 exceeds its width 66), as best seen in FIG. 4.

As previously mentioned, the first and second devices 34 and 36 may be located at the respective first and second positions 38, 40 within frame 18. The first and second positions 38, 40 within frame 18 may be located adjacent one another. The first and second positions 38, 40 may also be located alongside one another. As best seen in FIG. 4, in the embodiment shown and described herein, the second position 40 is located adjacent and alongside the first position 38 so that the second cartridge receiving device 36 is located adjacent and alongside the first cartridge receiving device 34. In other words, it is preferable to have the cartridge insert slot 42 of the first cartridge receiving device 34 located adjacent and alongside the cartridge insert slot 44 of the second cartridge receiving device 36, although such an arrangement is not required. So positioning the cartridge insert slots 42 and 44 alongside one another reduces the time needed for the cartridge access device (not shown) to retrieve a data cartridge 56 contained within either the first or second cartridge receiving device 34 or 36 and to insert that data cartridge 56 into the other device. Alternatively, other configurations may be used as would be obvious to persons having ordinary skill in the art after having become familiar with the teachings of the present invention. For example, the first and second cartridge receiving devices 34 and 36 may be stacked vertically or one-on-top of the other such that the cartridge insert slots 42 and 44 are generally oriented horizontally (not shown).

Referring now to FIG. 2, the second component configuration 14 may comprise a third cartridge receiving device 46 positioned within the frame 18. By way of example, the third cartridge receiving device 46 comprises a full-width cartridge read-write device. Alternatively, the third cartridge receiving device 46 may comprise any of a wide range of various different types of cartridge receiving devices that are now known in the art or that may be developed in the future.

The third cartridge receiving device 46 may be provided with a chassis or housing 108 suitable for holding the various systems and components (not shown) that may be contained within device 46. In the embodiment shown and described herein the housing 108 may comprise a generally rectangularly shaped structure having a top surface 110, bottom surface 112, a left side 114, and a right side 116. The left and right sides 114, 116 of housing 108 may be positioned in generally parallel, spaced-apart relation to one another and may be separated by a spaced distance that is about equal to the width 68 of the third device 46. The top and bottom surfaces 110 and 112 of housing 108 may also be positioned in generally parallel, spaced-apart relation to one another and may be separated by a spaced distance that is about equal to the height 62 of the third device 46. The height 62 of the third device 46 may be about equal to the spaced distance 74 separating the upper and lower plates 20 and 22 so that the third device 36 fits between the upper and lower plates 20, 22 of frame 18. Alternatively, of course, other configurations are possible.

For example, the height 62 of the third device 46 could be less than the spaced distance 74 thus requiring that extensions (not shown) similar to the extensions 104 and 106 for the first and second devices 34 and 36, respectively, be attached to either the top or bottom surface 110, 112 of housing 108 or alternatively, to both surfaces 110 and 112.

The housing 108 may be made from any of a wide range of materials, such as metals or plastics, that would be suitable for the intended application. By way of example, the various sides 110, 112, 114, 116 of housing 108 may be formed from sheet metal. Alternatively, other materials and/or forming techniques may be used, as would be obvious to persons having ordinary skill in the art after having become familiar with the teachings of the present invention.

The third cartridge receiving device 46 may be mounted to the third set of mounting locations 32 provided on the upper and lower plates 20, 22 of frame 18. As mentioned above, the various individual mounting locations comprising the third set of mounting locations 32 may comprise none, some, or all of the individual mounting locations comprising the other sets of mounting locations 28 and 30. In the embodiment shown and described herein, the third set of mounting locations 32 comprise a pair of mounting locations 32 on the upper plate 20 of frame 18 and a pair of mounting locations 32 provided on the lower plate 22 of frame 18. See FIG. 2. Alternatively, of course, other arrangements and configurations of the individual mounting locations that comprise the third set of mounting locations 32 are possible, as would be obvious to persons having ordinary skill in the art after having become familiar with the teachings of the present invention. Consequently, the present invention should not be regarded as limited to the arrangement and configuration of the individual mounting locations comprising the various sets of mounting locations 28, 30, and 32, that are shown and described herein.

It is generally preferred, but not required, that the third cartridge receiving device 46 be secured to the frame 18 with one or more fasteners 52. For example, in the embodiment shown and described herein, the cartridge receiving device 46 is secured to a pair of mounting locations 32 provided on the upper plate 20 by a pair of fasteners 52. Similarly, the cartridge receiving device 46 is secured to a pair of mounting locations 32 provided on the lower plate 22 by a pair of fasteners 52 (not shown in FIG. 2).

As was mentioned above, it is also generally preferred, but not required, that the third device 46 be mounted within frame 18 so that its cartridge insert slot 54 is oriented vertically (i.e. mounted such that the height 62 of the third device 46 exceeds its width 68) and so that slot 54 is located at about the same position as that of either of the cartridge insert slots 42 or 44 of the cartridge receiving devices 34 or 36.

As best seen by comparing FIG. 1 to FIG. 2, the reconfigurable cartridge processing module 10 allows for a half-width (i.e., half-height) cartridge read/write device 34 and a cartridge storage magazine 36, or some other combination of components, to be mounted to the frame 18. Alternatively, the cartridge processing module 10 may be reconfigured to receive a full-width (i.e., full-height) cartridge read/write device 46 within the frame 18. Although it comprises devices 34, 36, the first component configuration 12 requires no more volumetric space than that required by the second component configuration 14, which comprises device 46. Therefore, the data cartridge storage capacity of the data storage system can be increased without adding any additional volumetric space to the data storage system by reconfiguring module 10 from its second component configuration 14 to its first component configuration 12.

As explained earlier, the module 10 may be reconfigured from the first component configuration 12 to the second component configuration 14, or vice versa, by simply removing and installing the desired devices. To remove a device (e.g., 34, 36, or 46) from the reconfigurable cartridge processing module 10, the user must first disconnect the device, if a cartridge read/write device (e.g., 34 or 46), from the electrical system (not shown) associated with the data storage system (also not shown). Next, the user removes or disengages the fasteners 52 that secure the device (e.g., 34, 36, or 46) to the frame 18. The device or devices can then be removed from the reconfigurable cartridge processing module 10.

To install the desired device (e.g., 34, 36, or 46), the user first inserts the device (e.g., 34, 36 or 46) into the reconfigurable cartridge processing module 10. The device is next secured to the frame 18 by fasteners 52. The device, if a cartridge read/write device (e.g., 34 or 46), is then electrically connected to the electrical system (not shown) provided in the data storage system (also not shown).

It is contemplated that the inventive concepts herein described may be variously otherwise embodied and it is intended that the appended claims be construed to include alternative embodiments of the invention except insofar as limited by the prior art.

What is claimed is:

1. A reconfigurable cartridge processing module for use in a data storage system, comprising:
    a frame, said frame having a lower plate and an upper plate positioned in generally parallel, spaced-apart relation, said lower and upper plates of said frame having a plurality of sets of mounting locations provided thereon so that said frame defines a first component configuration and a second component configuration, the first component configuration comprising:
        a first cartridge receiving device secured directly to a first set of the plurality of sets of mounting locations provided on said lower and upper plates so that said first cartridge receiving device is located at a first position within said frame; and
        a second cartridge receiving device secured directly to a second set of the plurality of sets of mounting locations provided on said lower and upper plates so that said second cartridge receiving device is located at a second position within said frame, said first and second cartridge receiving devices together occupying a volumetric space within said frame, wherein said first and second cartridge receiving devices are located substantially between the upper and lower plates of said frame when said frame is in the first component configuration;
    the second component configuration comprising a third cartridge receiving device secured directly to a third set of the plurality of sets of mounting locations provided on said lower and upper plates, said third cartridge receiving device occupying substantially the same volumetric space within said frame as is occupied by said first and second cartridge receiving devices in said first component configuration, wherein said third cartridge receiving device is located substantially between the upper and lower plates of said frame when said frame is in the second component configuration.

2. The reconfigurable cartridge processing module of claim 1, wherein said first cartridge receiving device comprises a half-width cartridge read/write device.

3. The reconfigurable cartridge processing module of claim 1, wherein said second cartridge receiving device comprises a cartridge storage magazine.

4. The reconfigurable cartridge processing module of claim 1, wherein said third cartridge receiving device comprises a full-width cartridge read/write device.

5. The reconfigurable cartridge processing module of claim 1, wherein the second position is located adjacent the first position so that said second cartridge receiving device is located adjacent said first cartridge receiving device when said frame is in the first component configuration.

6. The reconfigurable cartridge processing module of claim 1, wherein the second position is located alongside the first position so that said second cartridge receiving device is located alongside said first cartridge receiving device when said frame is in the first component configuration.

7. A reconfigurable cartridge processing module for use in a data storage system, comprising:
    a frame, said frame having a lower plate and an upper plate positioned in generally parallel, spaced-apart relation, said lower and upper plates of said frame having a plurality of sets of mounting locations provided thereon so that said frame defines a first component configuration and a second component configuration, the first component configuration comprising:
        a first cartridge receiving device secured directly to a first set of the plurality of sets of mounting locations provided on said lower and upper plates so that said first cartridge receiving device is located at a first position within said frame; and
        a second cartridge receiving device secured directly to a second set of the plurality of sets of mounting locations provided on said lower and upper plates so that said second cartridge receiving device is located at a second position within said frame, the second position being located adjacent the first position so that said second cartridge receiving device is located alongside said first cartridge receiving device, wherein said first and second cartridge receiving devices are located substantially between the upper and lower plates of said frame when said frame is in the first component configuration;
    the second component configuration comprising a third cartridge receiving device secured directly to a third set of the plurality of sets of mounting locations provided on said lower and upper plates, said third cartridge receiving device in said second component configuration substantially replacing said first and second cartridge receiving devices in said first component configuration and vice-versa, so that a volumetric space occupied by said first and second cartridge receiving devices in said first component configuration is substantially occupied by said third cartridge receiving device in said second component configuration and vice-versa, wherein said third cartridge receiving device is located substantially between the upper and lower plates of said frame when said frame is in the second component configuration.

8. The reconfigurable cartridge processing module of claim 7, wherein said first cartridge receiving device comprises a half-width cartridge read/write device.

9. The reconfigurable cartridge processing module of claim 7, wherein said second cartridge receiving device comprises a cartridge storage magazine.

10. The reconfigurable cartridge processing module of claim 7, wherein said third cartridge receiving device comprises a full-width cartridge read/write device.

11. A reconfigurable cartridge processing module for use in a data storage system, comprising:
- a frame, said frame having a lower plate and an upper plate positioned in generally parallel, spaced-apart relation, said lower and upper plates of said frame having a plurality of sets of mounting locations provided thereon so that said frame defines a first component configuration and a second component configuration, the first component configuration comprising:
  - first cartridge receiving means secured directly to a first set of the plurality of sets of mounting locations provided on said lower and upper plates for receiving at least one data cartridge; and
  - second cartridge receiving means secured directly to a second set of the plurality of sets of mounting locations provided on said lower and upper plates for receiving said at least one data cartridge, wherein said first and second cartridge receiving means are located substantially between the upper and lower plates of said frame when said frame is in the first component configuration;
- the second component configuration comprising third cartridge receiving means secured directly to a third set of the plurality of sets of mounting locations provided on said lower and upper plates for receiving said at least one data cartridge, said third cartridge receiving means in said second component configuration replacing said first and second cartridge receiving means in said first component configuration and vice-versa so that a volumetric space occupied by said first and second cartridge receiving means in said first configuration is substantially occupied by said third cartridge receiving means in said second configuration and vice-versa, wherein said third cartridge receiving means is located substantially between the upper and lower plates of said frame when said frame is in the second component configuration.

12. The reconfigurable cartridge processing module of claim 11, wherein said second cartridge receiving means is mounted adjacent said first cartridge receiving means when said frame means is in the first component configuration.

13. The reconfigurable cartridge processing module of claim 11, wherein said second cartridge receiving means is mounted alongside said first cartridge receiving means when said frame means is in the first component configuration.

14. The reconfigurable cartridge processing module of claim 11, wherein said first cartridge receiving means comprises cartridge read/write means for reading data from and writing data to said at least one data cartridge.

15. The reconfigurable cartridge processing module of claim 11, wherein said second cartridge receiving means comprises cartridge storage magazine means for storing said at least one data cartridge.

16. The reconfigurable cartridge processing module of claim 11, wherein said third cartridge receiving means comprises cartridge read/write means for reading data from and writing data to said at least one data cartridge.

17. A method, comprising:
- providing a frame having a lower plate and an upper plate positioned in generally parallel, spaced-apart relation, said lower and upper plates of said frame having a plurality of sets of mounting locations thereon;
- defining a first component configuration by securing a first cartridge receiving device directly to a first set of the plurality of sets of mounting locations provided on said lower and upper plates and by securing a second cartridge receiving device directly to a second set of the plurality of sets of mounting locations provided on said lower and upper plates so that the second cartridge receiving device is located adjacent the first cartridge receiving device, wherein said first and second cartridge receiving devices are located substantially between the upper and lower plates of said frame when said frame is in the first component configuration; or, in the alternative,
- defining a second component configuration by securing a third cartridge receiving device directly to a third set of the plurality of sets of mounting locations provided on said lower and upper plates, said third cartridge receiving device in the second component configuration substantially replacing said first and second cartridge receiving devices in the first component configuration and vice-versa, so that a volumetric space occupied by said first and second cartridge receiving devices in the first component configuration is substantially occupied by said third cartridge receiving device in the second component configuration and vice-versa, wherein said third cartridge receiving device is located substantially between the upper and lower plates of said frame when said frame is in the second component configuration.

* * * * *